United States Patent
Liu et al.

(10) Patent No.: US 12,147,621 B1
(45) Date of Patent: Nov. 19, 2024

(54) CONDUCTIVE FILM AND TOUCH SENSOR

(71) Applicant: TPK Advanced Solutions Inc., Fujian (CN)

(72) Inventors: Kang Yu Liu, Hsinchu County (TW); Wei Jie Huang, Xiamen (CN); You Yi Ji, Xiamen (CN); Xiao Ping Guo, Xiamen (CN)

(73) Assignee: TPK Advanced Solutions Inc., Xiamen (CN)

( * ) Notice: Subject to any disclaimer, the term of this patent is extended or adjusted under 35 U.S.C. 154(b) by 0 days.

(21) Appl. No.: 18/319,539

(22) Filed: May 18, 2023

(51) Int. Cl.
| | |
|---|---|
| *G06F 3/041* | (2006.01) |
| *B32B 3/14* | (2006.01) |
| *B32B 7/025* | (2019.01) |
| *B32B 7/035* | (2019.01) |
| *B32B 15/02* | (2006.01) |
| *B32B 15/08* | (2006.01) |

(52) U.S. Cl.
CPC .............. *G06F 3/041* (2013.01); *B32B 3/14* (2013.01); *B32B 7/025* (2019.01); *B32B 7/035* (2019.01); *B32B 15/02* (2013.01); *B32B 15/08* (2013.01); *B32B 2260/02* (2013.01); *B32B 2260/046* (2013.01); *B32B 2307/412* (2013.01); *B32B 2457/00* (2013.01)

(58) Field of Classification Search
CPC ... B05D 3/00; B05D 3/04; B05D 5/06; B05D 7/00; B05D 7/24; B05D 2252/02; H01B 13/00; H01B 13/30; H01B 5/14
See application file for complete search history.

(56) References Cited

U.S. PATENT DOCUMENTS

| | | | | |
|---|---|---|---|---|
| 2015/0255029 A1* | 9/2015 | Niikura | ................... | G06F 3/044 345/98 |
| 2016/0342247 A1* | 11/2016 | Jin | ......................... | H05K 1/09 |
| 2017/0131804 A1* | 5/2017 | Sata | ................... | H10K 59/8791 |
| 2023/0076995 A1 | 3/2023 | Arimoto et al. | | |

FOREIGN PATENT DOCUMENTS

| | | |
|---|---|---|
| CN | 103889595 B | 6/2016 |
| TW | 201310471 A | 3/2013 |
| TW | 202113879 A | 4/2021 |
| TW | 202124055 A | 7/2021 |
| TW | 202316188 A | 4/2023 |
| WO | WO-2021131099 A1 * | 7/2021 ............... B05D 1/28 |

OTHER PUBLICATIONS

English translation of WO2021131099A1 equivalent to IDS submitted prior art TW 202124055A (Year: 2021).*

* cited by examiner

*Primary Examiner* — Nelson M Rosario
(74) *Attorney, Agent, or Firm* — Cooper Legal Group, LLC

(57) ABSTRACT

A conductive film includes a substrate and a first metal nanowire layer. The first metal nanowire layer is disposed on a first surface of the substrate. The first metal nanowire layer has an anisotropy value larger than or equal to 2.8 and smaller than or equal to 4.0.

20 Claims, 10 Drawing Sheets

CONDUCTIVE FILM AND TOUCH SENSOR

BACKGROUND

Field of Disclosure

The present disclosure relates to a conductive film and a touch sensor made of the conductive film.

Description of Related Art

Metal oxides are often used as electrode materials for conductive films of conventional touch panels. However, the conductive films made of metal oxides are unable to meet the flexibility requirements of products. Therefore, flexible transparent conductors, such as metal nanowire material, have been developed. However, based on the characteristics of the metal nanowire material, the conductive film made of the metal nanowire material has an optical performance which is inversely proportional to its conductive performance. On the other hand, in order to meet the requirements of mass production, a roll-to-roll process has been introduced into the production of the conductive films to improve production efficiency. Therefore, on the premise of meeting the requirements of mass production, how to provide a conductive film that can meet the optical performance and conductive performance is currently worth studying.

A method has been disclosed in China patent number CN103889595B of how to reduce the anisotropy value to be less than 2.0, and when the anisotropy value approaches 1.0, such a state can be referred to as "isotropy." However, although such a method can allow the conductive film to have a relatively consistent resistance value along the moving direction of the roll-to-roll process (which is also referred to as "longitudinal direction" or "machine direction (MD)") and the direction perpendicular to the longitudinal direction (which is also referred to as "transverse direction (TD)"), the conductive film designed by this reference is less able to meet the increasing demand for both optical performance and conductive performance.

SUMMARY

According to some embodiments of the present disclosure, a conductive film includes a substrate and a first metal nanowire layer. The first metal nanowire layer is disposed on a first surface of the substrate. The first metal nanowire layer has a first anisotropy value larger than or equal to 2.8 and smaller than or equal to 4.0.

In some embodiments of the present disclosure, the conductive film further includes a second metal nanowire layer disposed on a second surface of the substrate, in which the second surface faces away from the first surface, and the second metal nanowire layer is more isotropic than the first metal nanowire layer.

In some embodiments of the present disclosure, the second metal nanowire layer has a second anisotropy value smaller than 2.0.

In some embodiments of the present disclosure, the second anisotropy value of the second metal nanowire layer is larger than 1.0 and smaller than 1.5.

In some embodiments of the present disclosure, the second anisotropy value of the second metal nanowire layer is larger than 1.0 and smaller than 1.2.

According to some embodiments of the present disclosure, a touch sensor includes a substrate and a first metal nanowire layer. The a first metal nanowire layer is disposed on a first surface of the substrate and defines a plurality of first electrodes arranged at intervals and extending along a first direction, wherein the first metal nanowire layer has a first actual surface resistance and a first equivalent surface resistance, and the first actual surface resistance is 1.4 times to 2.0 times the first equivalent surface resistance.

In some embodiments of the present disclosure, the touch sensor further includes a second metal nanowire layer disposed on a second surface of the substrate and defines a plurality of second electrodes arranged at intervals and extending along a second direction, wherein the second surface faces away from the first surface, the second metal nanowire layer has a second actual surface resistance and a second equivalent surface resistance, and the second actual surface resistance is equal to the first actual surface resistance.

In some embodiments of the present disclosure, the first equivalent surface resistance is smaller than the second equivalent surface resistance.

In some embodiments of the present disclosure, the first direction is perpendicular to the second direction.

In some embodiments of the present disclosure, the touch sensor further includes a second metal nanowire layer disposed on a second surface of the substrate and defines a plurality of second electrodes arranged at intervals and extending along a second direction, wherein the second surface faces away from the first surface, the second metal nanowire layer has a second actual surface resistance and a second equivalent surface resistance, the first actual surface resistance is smaller than the second actual surface resistance, and the first equivalent surface resistance is equal to the second equivalent surface resistance.

In some embodiments of the present disclosure, the first direction is perpendicular.

According to the aforementioned embodiments of the present disclosure, since the first metal nanowire layer in the conductive film of the present disclosure has a high anisotropy value, the touch sensor made of the conductive film can meet a more demanding electrical requirement (e.g., lower resistance) under certain optical specifications, or the touch sensor made of the conductive film can meet a more demanding optical requirement (e.g., lower haze) under certain electrical specifications. Hence, it is more flexible to balance the optical performance and the conductive performance of the touch sensor.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
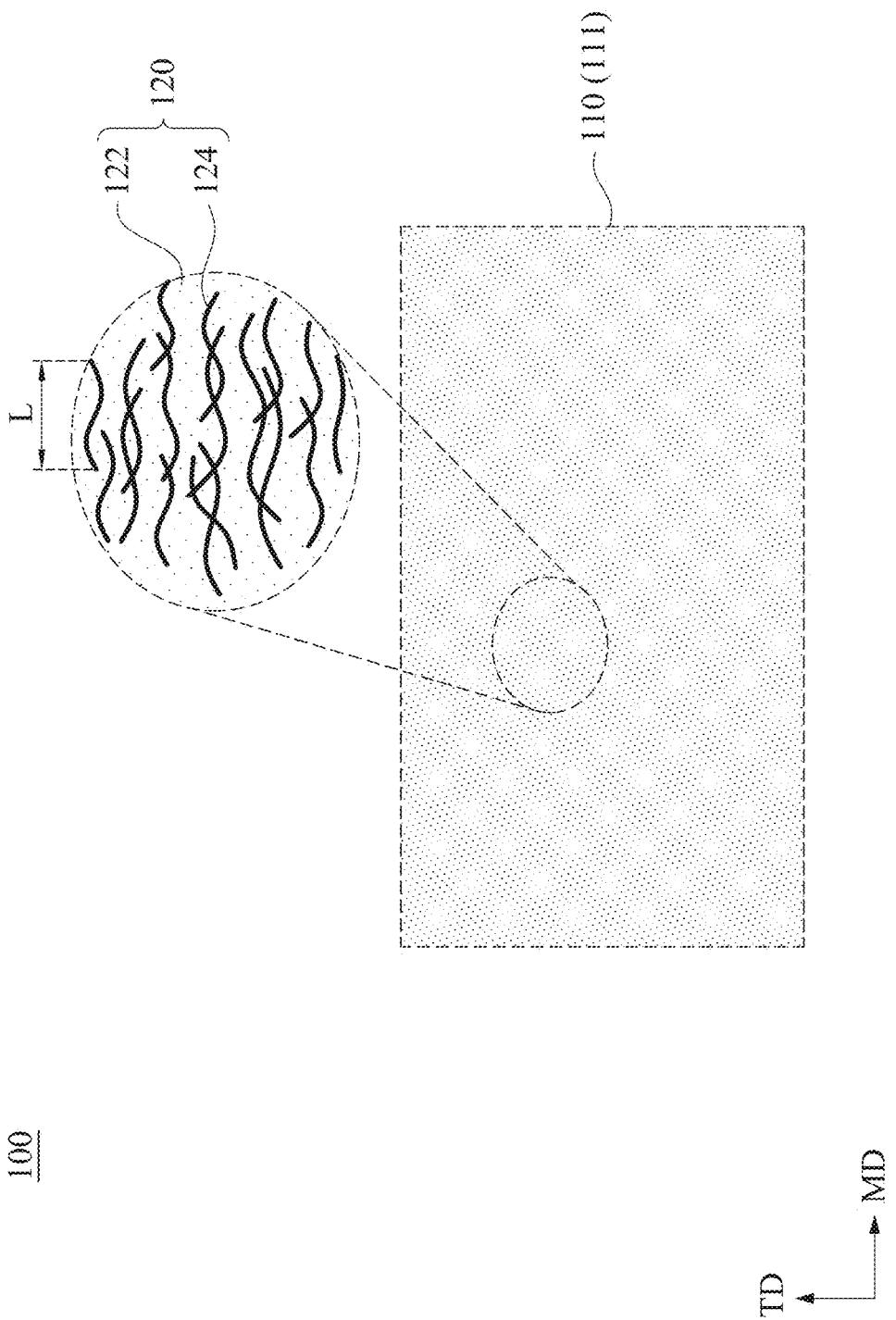
FIG. 1 is a schematic top view illustrating a conductive film according to some embodiments of the present disclosure.

Reference will now be made in detail to the present embodiments of the disclosure, examples of which are illustrated in the accompanying drawings. However, it should be understood that these details should not be intend to limit the present disclosure. In addition, for the convenience of readers, the size of each element in the drawings is not illustrated according to actual scale. It should be understood that relative terms such as "lower" or "bottom" and "upper" or "top" can be used herein to describe the relationship between one element and another element, as shown in the figures. It should be understood that relative terms are intended to include different orientations of the device other than those shown in the figures.

Reference is made to FIG. 1, which is a schematic top view illustrating a conductive film 100 according to some embodiments of the present disclosure. The conductive film 100 of the present disclosure may be, for example, a thin film formed by a roll-to-roll process without patterning. The conductive film 100 includes a substrate 110 and a first metal nanowire layer 120, and the first metal nanowire layer 120 is disposed on a first surface 111 of the substrate 110. In some embodiments, the substrate 110 may be, for example, a flexible transparent substrate, and a material of the substrate 110 may include, but is not limited to, transparent materials such as polypropylene, polyvinyl chloride, polystyrene, polycarbonate, cycloolefin polymer, cycloolefin copolymer, polyethylene terephthalate, polyethylene naphthalate, colorless polyimide, or combinations thereof.

As shown in the partially enlarged area of FIG. 1, the first metal nanowire layer 120 may include a matrix 122 and a plurality of metal nanowires 124 distributed in the matrix 122, in which the matrix 122 may include acrylic material such as poly(methyl methacrylate), and the metal nanowires 124 may include silver nanowires, gold nanowires, copper nanowires, nickel nanowires, or combinations thereof. In some embodiments, the first metal nanowire layer 120 may further include a binder such as cellulose, in which the binder is used to improve the compatibility between the metal nanowires 124 and the matrix 122 and the stability of the metal nanowires 124 in the matrix 122, and also to adjust the dispersion of the metal nanowires 124 in the matrix 122.

When the first metal nanowire layer 120 is formed on the first surface 111 of the substrate 110 through a roll-to-roll process, the moving direction of the continuously supplied substrate 110 during the roll-to-roll process is referred to as "the longitudinal direction MD" (or may be referred to as "the machine direction"), and the direction perpendicular to the longitudinal direction MD is referred to as "the transverse direction TD". Therefore, the conductive film 100 formed by the roll-to-roll process has a first dimension extending along the longitudinal direction MD and a second dimension extending perpendicular to the longitudinal direction MD (or extending along the transverse direction TD). As shown in FIG. 1, the major axis L of most of the metal nanowires 124 extends substantially along the first dimension. That is, the amount of metal nanowires 124 that have a major axis L extending substantially along the first dimension is much greater than the amount of metal nanowires 124 that have a major axis L not extending along the first dimension. For the convenience of description, "the metal nanowires 124 with a major axis L extending substantially along the first dimension" is simply referred to as "the metal nanowires 124 substantially arranged along the first dimension (toward the first dimension)" hereinafter. It should be understood that although the shape (profile) of the metal nanowires 124 is drawn as an "S" in FIG. 1, the shape of the metal nanowires 124 is not limited thereto. The shape of the metal nanowires 124 of the present disclosure can also be linear, curved, or other irregular shapes. Any shape that enables the extension direction of the major axis L of the metal nanowires 124 to be roughly defined is within the scope of the present disclosure. In some embodiments, a length of a single metal nanowire 124 can be less than 30 microns (μm), preferably less than 20 microns, and more preferably less than 18 microns; a cross-sectional size (e.g., cross-sectional diameter) of a single metal nanowire 124 may be less than 50 nanometers (nm), preferably less than 25 nm, and more preferably less than 18 nm.

Since most of the metal nanowires 124 in the first metal nanowire layer 120 are substantially arranged along the first dimension, the contact points (or intersections) formed by the metal nanowires 124 along the first dimension are more than the contact points formed by the metal nanowires 124 along the second dimension. Therefore, the first metal nanowire layer 120 can form more electron transferring paths along the first dimension. In this way, the resistance (RMD) of the first metal nanowire layer 120 along the longitudinal direction MD is lower than the resistance (RTD) of the first metal nanowire layer 120 along the transverse direction TD, in which a ratio (RTD/RMD) of the transverse resistance (RTD) to the longitudinal resistance (RMD) is defined as "the anisotropy value of the first metal nanowire layer 120." Specifically, a first transverse resistance RTD1 can be measured from the first metal nanowire layer 120 along the transverse direction TD, a first longitudinal resistance RMD1 can be measured from the first metal nanowire layer 120 along the longitudinal direction MD, and the first transverse resistance RTD1 is greater than the first longitudinal resistance RMD1 with a certain degree of difference. In some embodiments, the anisotropy value of the first metal nanowire layer 120 is larger than or equal to 2.8 and smaller than or equal to 4.0. That is, the first metal nanowire layer 120 of the present disclosure has a high anisotropy value. As a supplementary note, it is understood by those of ordinary skill in the art that when there is no post-treatment in the roll-to-roll process of the conductive film that is made of metal nanowire materials, the anisotropy value of the conductive film is about 2.0.

Figure 2:
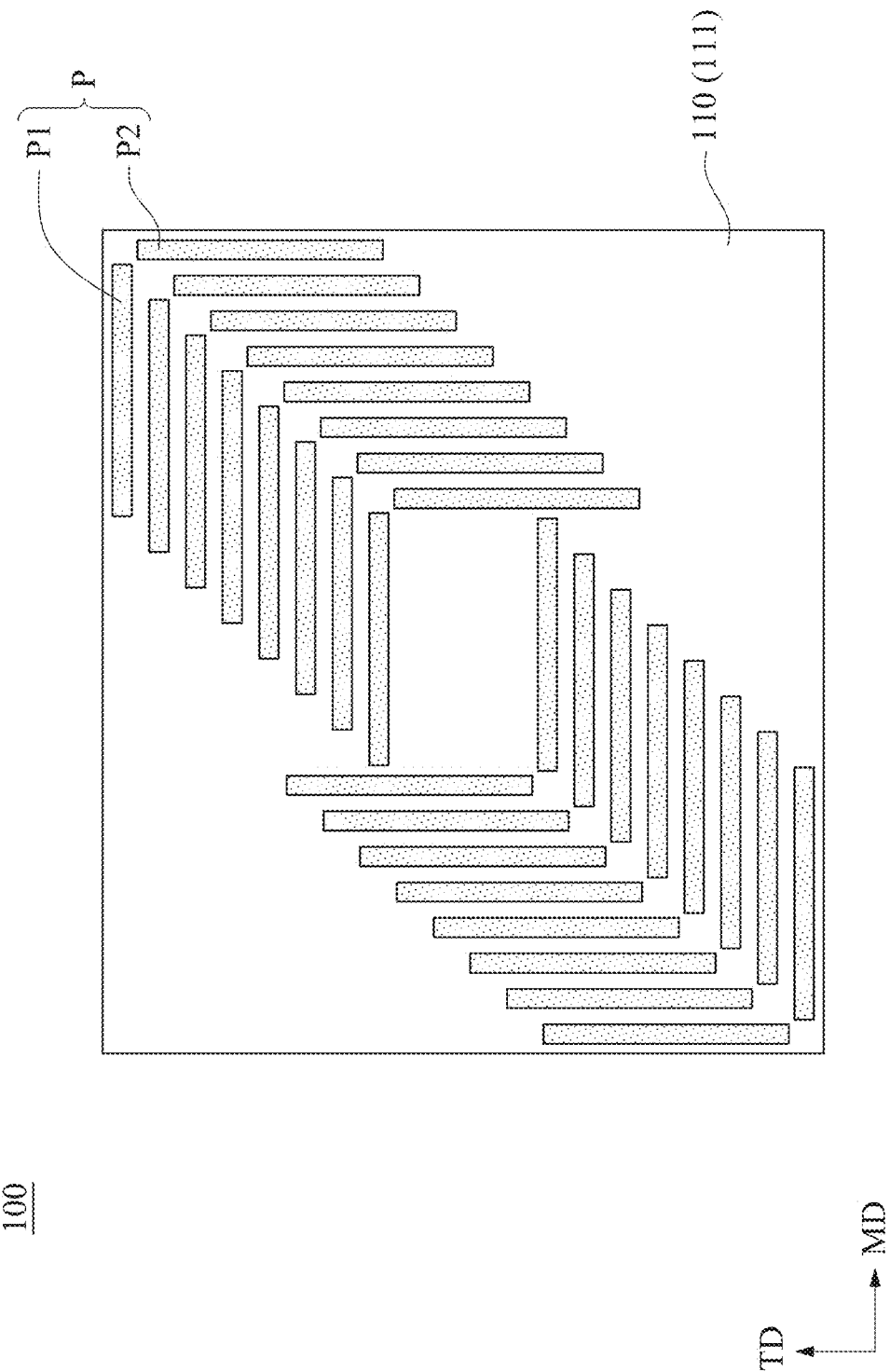
FIG. 2 is a schematic view illustrating a measurement method of a first longitudinal resistance and a first transverse resistance according to some embodiments of the present disclosure.

FIG. 2 is a schematic view illustrating a measurement method of a first longitudinal resistance RMD1 and a first transverse resistance RTD1 according to some embodiments of the present disclosure. The measurement method may include the following steps. Step S1: Pattern the first metal nanowire layer 120 of the conductive film 100 into a plurality of longitudinal portions P1 extending along the longitudinal direction MD and a plurality of transverse portions P2 extending along the transverse direction TD, in which the longitudinal portions P1 and the transverse portions P2 are identical in length and also identical in width. Step S2: Place a probe at each end of each longitudinal portion P1, and also place a probe at each end of each transverse portion P2, so as to measure the longitudinal resistance R1 of each longitudinal portion P1 and the transverse resistance R2 of each transverse portion P2. Step S3: Average the measured longitudinal resistances R1 to obtain the first longitudinal resistance RMD1, and average the measured transverse resistances R2 to obtain a first transverse resistance RTD1.

Figure 3A:
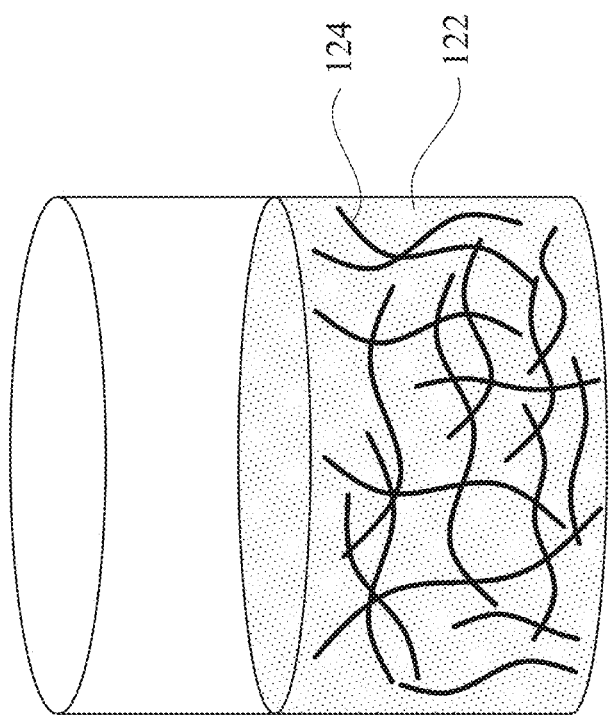
FIG. 3A to FIG. 3C are schematic views illustrating a manufacturing method of the conductive film of FIG. 1 in different steps.
Figure 3B:
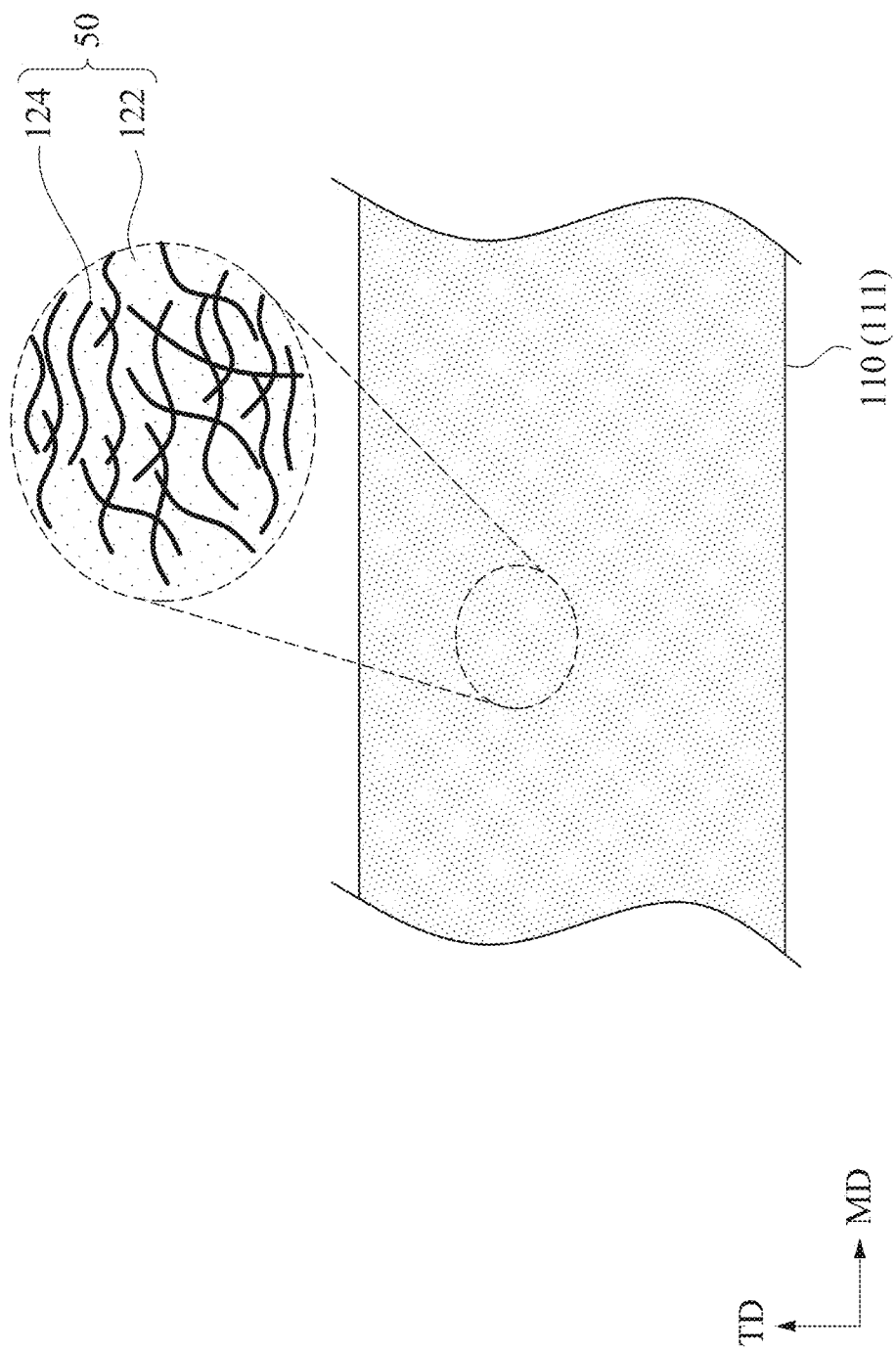
Figure 3C:
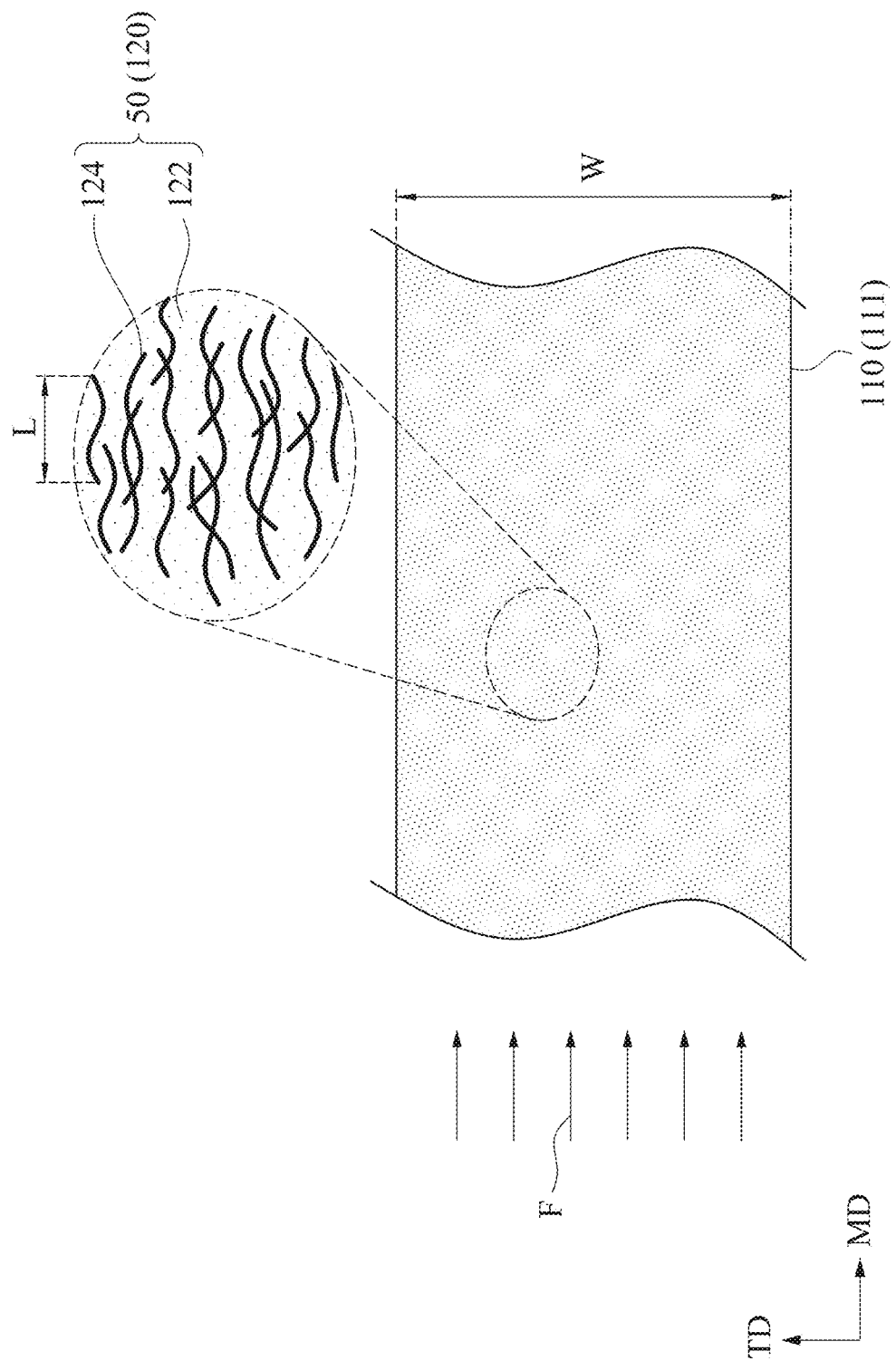

The following describes how the arrangement of the metal nanowires 124 is adjusted in the present disclosure to obtain the aforementioned anisotropy value of the first metal nanowire layer 120. In the following description, the steps of FIG. 3A to FIG. 3C will be taken as an example to illustrate the manufacturing method of the conductive film 100 of the present disclosure. FIG. 3A to FIG. 3C are schematic views illustrating a manufacturing method of the conductive film 100 of FIG. 1 in different steps, in which FIG. 3B and FIG. 3C are schematic top views.

Reference is made to FIG. 3A. Firstly, an ink containing a matrix 122 and a plurality of metal nanowires 124 is provided. In some embodiments, the ink further includes a binder (e.g., cellulose) to enhance the compatibility between the metal nanowires 124 and the matrix 122 and the stability of the metal nanowires 124 in the matrix 122, in which the content of the binder can affect the initial distribution state of the metal nanowires 124 when the ink is subsequently coated on the surface of the substrate 110. Specifically, in the ink, the weight ratio of the metal nanowires 124 to the binder ranges from 1:1 to 1:0.1, such that the compatibility between the metal nanowires 124 and the matrix 122 as well as the stability of the metal nanowires 124 are both taken into account, and the reorientation control of the metal nanowires 124 after the ink is coated on the substrate 110 can be improved.

Reference is made to FIG. 3B. Subsequently, the substrate 110 is continuously supplied through the roll-to-roll process and moves along the longitudinal direction MD of the roll-to-roll process. Then, the ink is disposed on the entire first surface 111 of the substrate 110 through, for example, a nozzle coating process, to form a wet film 50 on the first surface 111 of the substrate 110, in which the wet film 50 has a first dimension extending along the longitudinal direction MD and a second dimension extending along the transverse direction TD. Since the substrate 110 moves continuously along the longitudinal direction MD during the ink coating process, the metal nanowires 124 in the ink are subjected to a shear force that is applied along the longitudinal direction MD to form an initial orientation, thereby being slightly arranged toward the first dimension, as shown in FIG. 3B. As a comparative example, after the wet film 50 is formed, if the wet film 50 is directly cured to form a metal nanowire layer, the anisotropy value of the metal nanowire layer only ranges from about 1.5 to 2.0 due to the shear force that is applied to the substrate 110 continuously moving along the longitudinal direction MD.

Reference is made to FIG. 3C. Then, an airflow F is applied to the wet film 50 along the first dimension that is parallel to the longitudinal direction MD, such that the metal nanowires 124 in the wet film 50 are driven by the airflow F to be further reoriented, and thus most of the metal nanowires 124 in the wet film 50 can be more effectively arranged toward the first dimension. In more detail, when the wet film 50 moves along the longitudinal direction MD, the airflow F is continuously applied to the surface of the wet film 50 along the first dimension and from top of the surface of the wet film 50, and is preferably applied to the surface of the wet film 50 immediately after the wet film 50 is formed to ensure that the wet film 50 flows sufficiently. On the other hand, the airflow F may be provided by a suitable airflow source. In some embodiments, the airflow source may include a slit-type air outlet with a plurality of (e.g., 2 to 8) air knives, in which the air knives are parallel to each other and arranged at intervals (e.g., the distance between the air knives may be 0.4 meters to 0.6 meters), and each of the air knives extends along the transverse direction TD. In some embodiments, a length of the slit-type air outlet can be designed to be greater than or equal to a lateral width W of the wet film 50, so as to ensure that the wet film 50 is evenly blown by the airflow F. In addition, a width of the slit-type air outlet can be less than 1 inch to prevent the airflow F from being too dispersed and therefore reduce the blowing effect. In some embodiments, the angle of the airflow F (the included angle between the flow direction of the airflow F and the surface of the wet film 50) may be 45 degrees to 135 degrees, so as to better control the rotation of the metal nanowires 124. In detail, if the angle of the airflow F is less than 45 degrees or greater than 135 degrees, the rotation of the metal nanowires 124 may be limited and only displacement occurs, which cannot further promote the effective reorientation of the metal nanowires 124. In some embodiments, the flow rate of the airflow F may range from 4 m/s to 10 m/s to better control the rotation of the metal nanowires 124 and avoid reducing the distribution uniformity of the metal nanowires 124 in the wet film 50. In detail, if the flow rate of the airflow F is less than 4 m/s, the rotation of the metal nanowires 124 may be limited, and the metal nanowires 124 cannot be further reoriented; and if the flow rate of the airflow F is greater than 10 m/s, it may cause the displacement of the metal nanowires 124 to be too large and thus lose its original distribution uniformity. The above parameters regarding the control of the airflow F have their technical significance. In detail, in addition to effectively reorienting the metal nanowires 124 to increase the anisotropy value, it is also necessary to consider not causing excessive arrangement of the metal nanowires 124 along the longitudinal direction MD to avoid not forming enough contact points (i.e., electron transferring paths) along the transverse direction TD, which causes the first transverse resistance RTD1 to be excessively large, which is not conducive to the application of the conductive film 100.

In some embodiments, the viscosity of the ink used to form the wet film 50 can affect the reorientation degree of the metal nanowires 124 that is caused by the airflow F. In detail, if the viscosity of the ink is too high, the metal nanowires 124 in the wet film 50 are more difficult to be driven by the airflow F, resulting in the limited rotation of the metal nanowires 124, and thus the metal nanowires 124 cannot be reoriented to be arranged along the first dimension; if the viscosity of the ink is too low, the fluidity of the wet film 50 may be too high, and the displacement of the metal nanowires 124 may be too large, leading to difficulties in controlling the reorientation of the metal nanowires 124. The content of the aforementioned binder is also one of the factors affecting the viscosity of the ink. On the other hand, due to the low curl degree of the metal nanowires 124 used in the present disclosure, the metal nanowires 124 can obviously be arranged along the same dimension after being driven by the airflow F, thus having a high anisotropy value. In detail, the longer the metal nanowire 124 is, the easier it is to cause the metal nanowire 124 to curl, and when a layer contains metal nanowires 124 with more curled shapes (e.g., nearly circular shapes), it is less able to adjust the anisotropy value of the layer through the application of the airflow F due to higher isotropy.

Reference is continuously made to FIG. 3C. Next, a drying step is performed on the wet film 50, such that the wet film 50 is cured to form the first metal nanowire layer 120. In some embodiments, the wet film 50 may go through multiple (e.g., eight) baking chambers through the operation of a roll-to-roll processing equipment, and the wet film 50 may stay in each baking chamber for several minutes, so as to be completely cured under high temperature. In some embodiments, in the drying step, eight baking chambers may be sequentially configured as two of which are for heating stage, four of which are for thermostatic stage, and two of which are for cooling stage, so as to prevent the wet film 50 from being damaged or generating defects due to instantaneous excessive heating or cooling, and to further ensure the high anisotropy value of the finally formed first metal nanowire layer 120. Specifically, in the heating stage, the wet film 50 may stay in two baking chambers with drying temperatures of about 30° C. and about 50° C. in sequence for about 1 minute; in the thermostatic stage, the wet film 50 may stay in four baking chambers with a drying temperature of about 120° C. for about 2 minutes; and in the cooling stage, the wet film 50 may stay in two baking chambers with drying temperatures of about 70° C. and about 50° C. in sequence for about 1 minute.

After the drying step is completed, the conductive film 100 as shown in FIG. 1 can be obtained. Since the wet film 50 is driven by the airflow F before curing, the metal nanowires 124 therein are further reoriented to be properly arranged toward the first dimension. Therefore, the first metal nanowire layer 120 may have a high anisotropy value. As mentioned above, the anisotropy value of the first metal nanowire layer 120 of the present disclosure needs to be intentionally controlled at 2.8 to 4.0.

Figure 4:
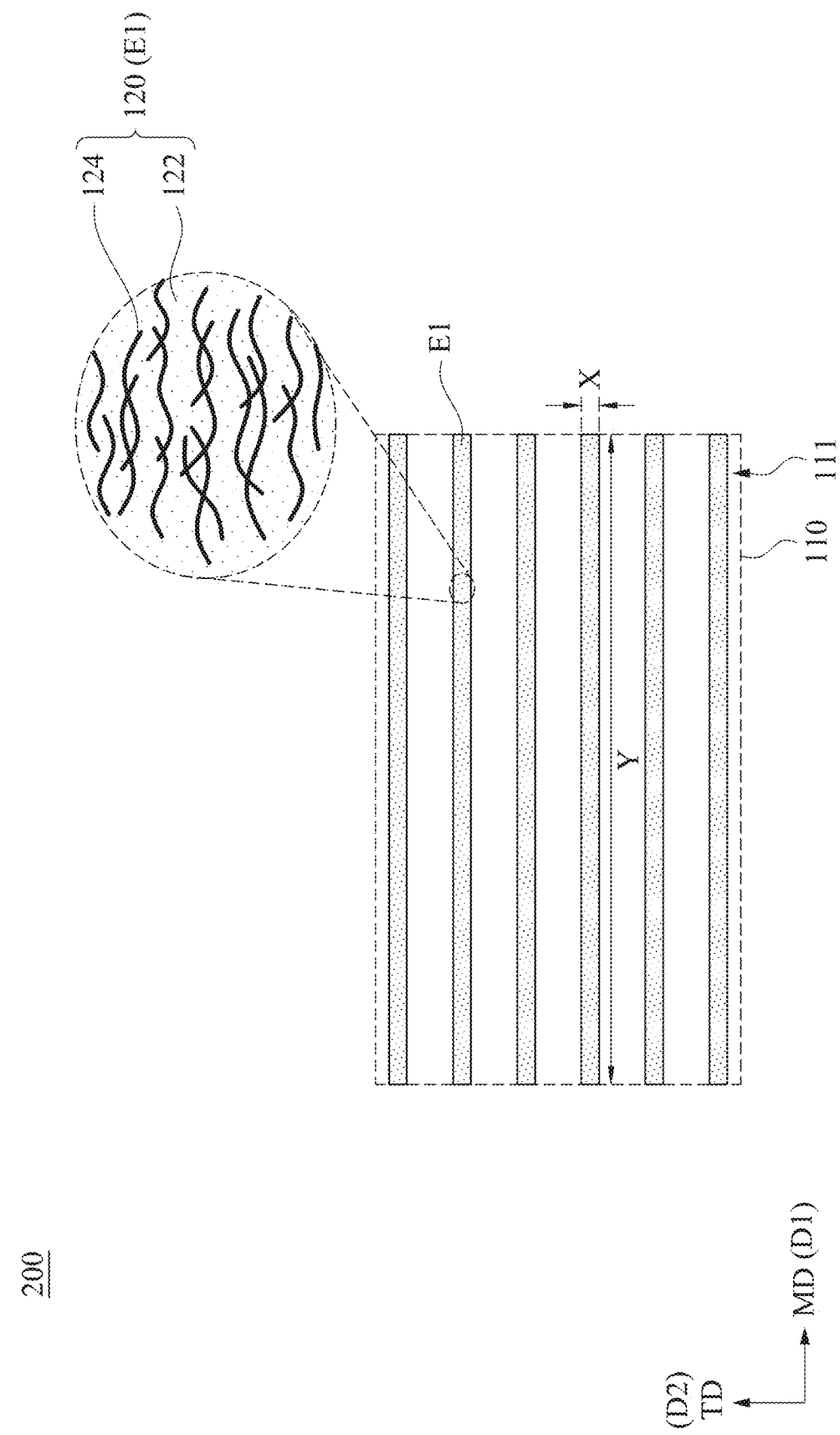
FIG. 4 is a schematic partial top view illustrating a touch sensor according to some embodiments of the present disclosure.

Reference is made to FIG. 4, which is a schematic partial top view illustrating a touch sensor 200 according to some embodiments of the present disclosure. In detail, the touch sensor 200 is obtained by further patterning the first metal nanowire layer 120 in the conductive film 100. The touch sensor 200 includes a substrate 110 and a first metal nanowire layer 120. The first metal nanowire layer 120 is disposed on the first surface 111 of the substrate 110, and the first metal nanowire layer 120 is patterned to define a plurality of first electrodes E1 arranged at intervals and extending along the first direction D1, in which the first direction D1 of this embodiment is parallel to the longitudinal direction MD of the aforementioned roll-to-roll process. In the embodiment of FIG. 4, the first electrodes E1 are strip-shaped electrodes extending along a first direction D1 and arranged at intervals along a second direction D2, in which the first direction D1 is substantially perpendicular to the second direction D2. As mentioned above, since the first electrode E1 is formed by directly patterning the high-anisotropy first metal nanowire layer 120 along a dimension with a lower resistance (i.e., along the longitudinal direction MD), the first electrode E1 can meet the electrical requirements of longer wirings.

On the other hand, since the first electrode E1 has a relatively low line resistance, the equivalent surface resistance (sheet resistance) of the first metal nanowire layer 120 calculated from the line resistance of the first electrode E1 can be smaller than the actual surface resistance of the first metal nanowire layer 120. In other words, when the metal nanowires 124 used is of the same amount (i.e., of the same concentration), compared with the case of not intentionally aligning the metal nanowires 124 in a specific dimension, aligning the metal nanowires 124 in the first metal nanowire layer 120 substantially in the same dimension (i.e., making the first metal nanowire layer 120 have a high anisotropy value) can make the first electrode E1, which is formed by patterning the first metal nanowire layer 120, have a lower line resistance. As such, the first metal nanowire layer 120 can be provided with a lower equivalent surface resistance, thereby meeting the electrical requirement (low resistance) of the touch sensor 200. In detail, in the present disclosure, the actual surface resistance of the first metal nanowire layer 120 (which may also be referred to as the first actual surface resistance) is 1.4 times to 2.0 times the equivalent surface resistance of the first metal nanowire layer 120 (which may also be referred to as the first equivalent surface resistance).

Regarding the measurement method of the actual surface resistance of the first metal nanowire layer 120, the actual surface resistance of the first metal nanowire layer 120 can be measured by measuring the surface resistance of the entire surface of the first metal nanowire layer 120 that has not been patterned (e.g., the surface resistance of the entire surface of the first metal nanowire layer 120 shown in FIG. 1) by a conventional surface resistance meter (e.g., a four-point probe measurement device or a non-contact measurement device).

Regarding the measurement method of the equivalent surface resistance of the first metal nanowire layer 120, the measurement method includes the following steps. Step 1: Pattern the first metal nanowire layer 120 whose actual surface resistance has been measured to form a plurality of electrodes (e.g., the first electrodes E1 shown in FIG. 4). Step 2: Measure the line resistance of each of the electrodes by a two-point probe measurement device. Step 3: Average the line resistances to obtain the average line resistance, and convert the equivalent surface resistance of the first metal nanowire layer 120 according to the following Formula (1), in which the "line width" in Formula (1) is the width X of the first electrode E1, and the "line length" in Formula (1) is the length Y of the first electrode E1.

Formula(1):equivalent surface resistance=[(line width)/(line length)]×average line resistance From another perspective, compared with not intentionally aligning the metal nanowires 124 in a specific dimension, an electrode with low line resistance of the present disclosure can be formed by arranging the metal nanowires 124 in a specific dimension instead of increasing the amount of metal nanowires 124 (i.e., increasing the ink concentration). That is, in the present disclosure, the electrical requirement of specific specifications (e.g., low resistance) can be met with a lower-concentration ink. In this way, the haze in the visible area of the touch sensor 200 can be reduced, which helps to meet the optical requirement (low haze) of the touch sensor 200. Overall, by designing the anisotropy value of the first metal nanowire layer 120 of the present disclosure, the touch sensor 200 can meet a more demanding electrical requirement (lower resistance) under the same optical specifications, and can meet a more demanding optical requirement (lower haze) under the same electrical specifications. Therefore, it is more flexible to balance the optical performance and the conductive performance of the touch sensor.

A conductive film of the present disclosure is prepared according to the aforementioned manufacturing method, and the metal nanowire layer in the conductive film is patterned to form electrodes, in which the actual surface resistance of the metal nanowire layer, the anisotropy value of the metal nanowire layer, the line resistance of the electrode along the longitudinal direction, and the equivalent surface resistance of the metal nanowire layer converted from the line resistance are listed in Table 1.

TABLE 1

|  | Embodiment 1 | Embodiment 2 |
|---|---|---|
| Actual surface resistance of the metal nanowire layer (ops) | 48.69 | 52.34 |
| Anisotropy value of the metal nanowire layer ($R_{TD}/R_{MD}$) | 3.26 | 2.96 |
| Line resistance of the electrode along the longitudinal direction (KΩ) | 2.33 | 2.81 |
| Equivalent surface resistance of the metal nanowire layer (ops) | 29.3 | 35.3 |
| Actual surface resistance/ Equivalent surface resistance | ~1.6 | ~1.4 |

Figure 5:
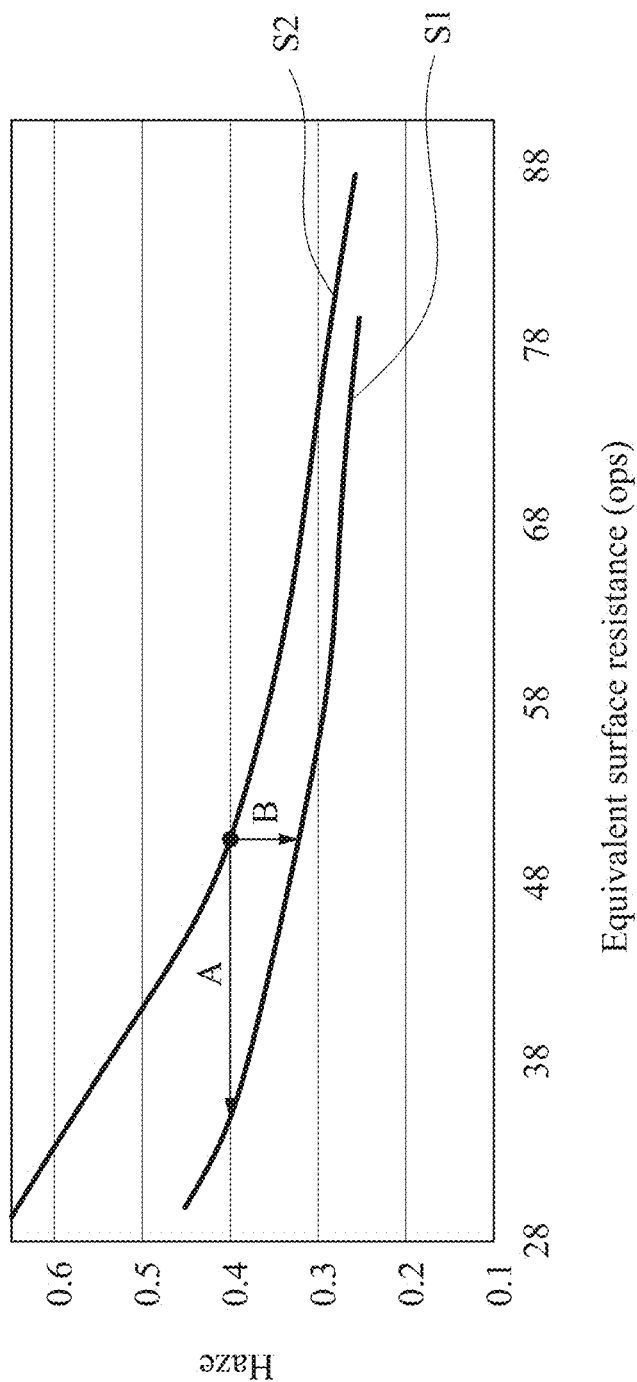
FIG. 5 shows a relationship between the haze and equivalent surface resistance of a metal nanowire layer.

Reference is made to FIG. 5, which shows a relationship between the haze and equivalent surface resistance of a metal nanowire layer, in which the curve S1 represents the relationship between the haze and equivalent surface resistance of the metal nanowire layer with high anisotropy value (referred to as "product 1" hereinafter), and the curve S2 represents the relationship between the haze and equivalent surface resistance of the metal nanowire layer with low anisotropy value (referred to as "product 2" hereinafter). The direction of arrow A indicates that when the metal nanowire layers of product 1 and product 2 are made by the ink of same concentration, and when product 1 and product 2 have the same haze (e.g., 0.4), the metal nanowire layer with higher anisotropy value (i.e., product 1) has relatively low equivalent surface resistance (e.g., about 35 ops). The direction of arrow B indicates that when the product 1 and product 2 have the same equivalent surface resistance (e.g., 50 ops), the metal nanowire layer with higher anisotropy value (i.e., product 1) has relatively low haze (e.g., about 0.32). In other words, product 1 can be formed by the ink with relatively low density, which can effectively reduce costs.

Figure 6:
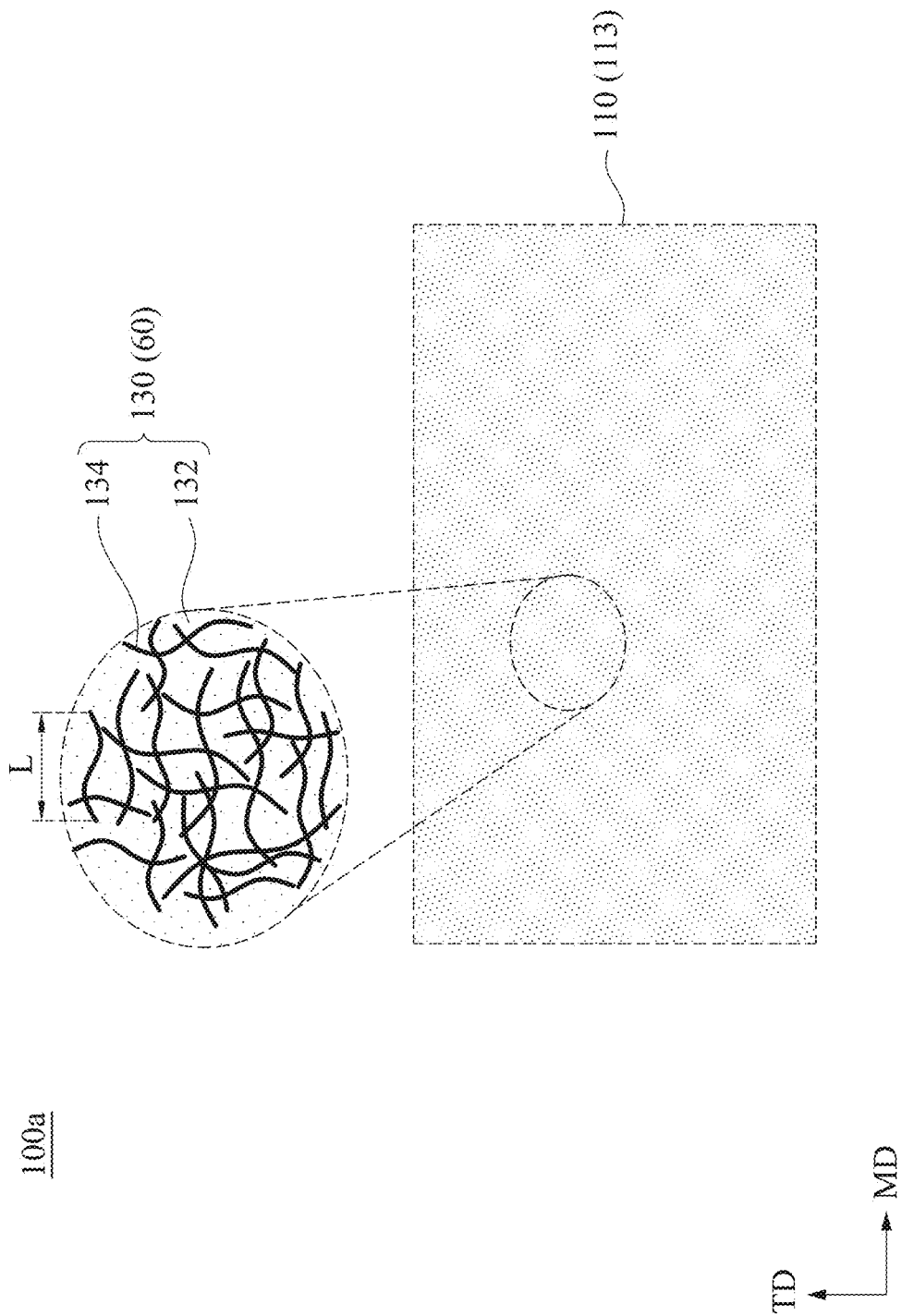
FIG. 6 is a schematic top view illustrating a conductive film according to some other embodiments of the present disclosure.

Reference is made to FIG. 6, which is a schematic top view illustrating a conductive film 100a according to some other embodiments of the present disclosure. In detail, the conductive film 100a shown in FIG. 6 is an embodiment in which the conductive film 100 in FIG. 1 further includes a second metal nanowire layer 130, in which a second metal nanowire layer 130 can be disposed on a second surface 113 of the substrate 110, and the second surface 113 faces away from the first surface 111. In other words, the second metal nanowire layer 130 in FIG. 6 and the first metal nanowire layer 120 in FIG. 1 are disposed on opposite surfaces of the substrate 110. Reference is made to FIG. 1 and FIG. 6. In some embodiments, the second metal nanowire layer 130 can also include a matrix 132 and a plurality of metal nanowires 134 distributed in the matrix 132, in which the material of the matrix 132 and the material, structure, and shape (profile) of the metal nanowires 134 are mentioned in the foregoing descriptions regarding the matrix 122 and the metal nanowires 124 in the first metal nanowire layer 120 and will not be repeated hereinafter.

As shown in FIG. 6, compared to the metal nanowires 124 in the first metal nanowire layer 120, the metal nanowires 134 in the second metal nanowire layer 130 are not substantially arranged toward a specific dimension, but are relatively disordered, dispersed, and randomly distributed, which can reduce the anisotropy value of the second metal nanowire layer 130. Specifically, a transverse resistance (which may also be referred to as a second transverse resistance RTD2) can be measured from the second metal nanowire layer 130 along the transverse direction TD, a longitudinal resistance (which may also be referred to as a second longitudinal resistance RMD2) can be measured from the second metal nanowire layer 130 along the longitudinal direction MD, in which a ratio (RTD2/RMD2) of the second transverse resistance (RTD2) to the second longitudinal resistance (RMD2) is defined as "the anisotropy value of the second metal nanowire layer 130." Overall, compared with the first metal nanowire layer 120, the anisotropy value of the second metal nanowire layer 130 is lower, which may be less than 2.0. In some embodiments, the anisotropy value of the second metal nanowire layer 130 may be greater than 1.0 and less than 1.5, or greater than 1.0 and less than 1.2. In preferred embodiments, the second metal nanowire layer 130 may approach 1.0, which can be referred to as a state of "isotropy." The method for achieving the isotropy state of the second metal nanowire layer 130 can be referred in the aforementioned China patent number CN103889595B.

It is worth noting that the first metal nanowire layer 120 and the second metal nanowire layer 130 of the conductive film 100a of the present disclosure are formed in the same roll-to-roll process, and when the substrate 110 moves along the longitudinal direction MD, the anisotropy value differences between the metal nanowire layers on the opposite surfaces of the substrate 110 are created. The treatment to the first metal nanowire layer 120 described above during the roll-to-roll process is also completely different from the treatment to the second metal nanowire layer 130 using conventional techniques during the roll-to-roll process, in which the goal of the conventional techniques is to make the second metal nanowire layer 130 achieve the isotropy state. For example, the directions of airflow applied in the treatment to the first metal nanowire layer 120 and the treatment to the second metal nanowire layer 130 are different. However, it is noted that the direction of airflow is not the only factor that makes the difference between the treatment to the first metal nanowire layer 120 and the treatment to the second metal nanowire layer 130.

Figure 7:
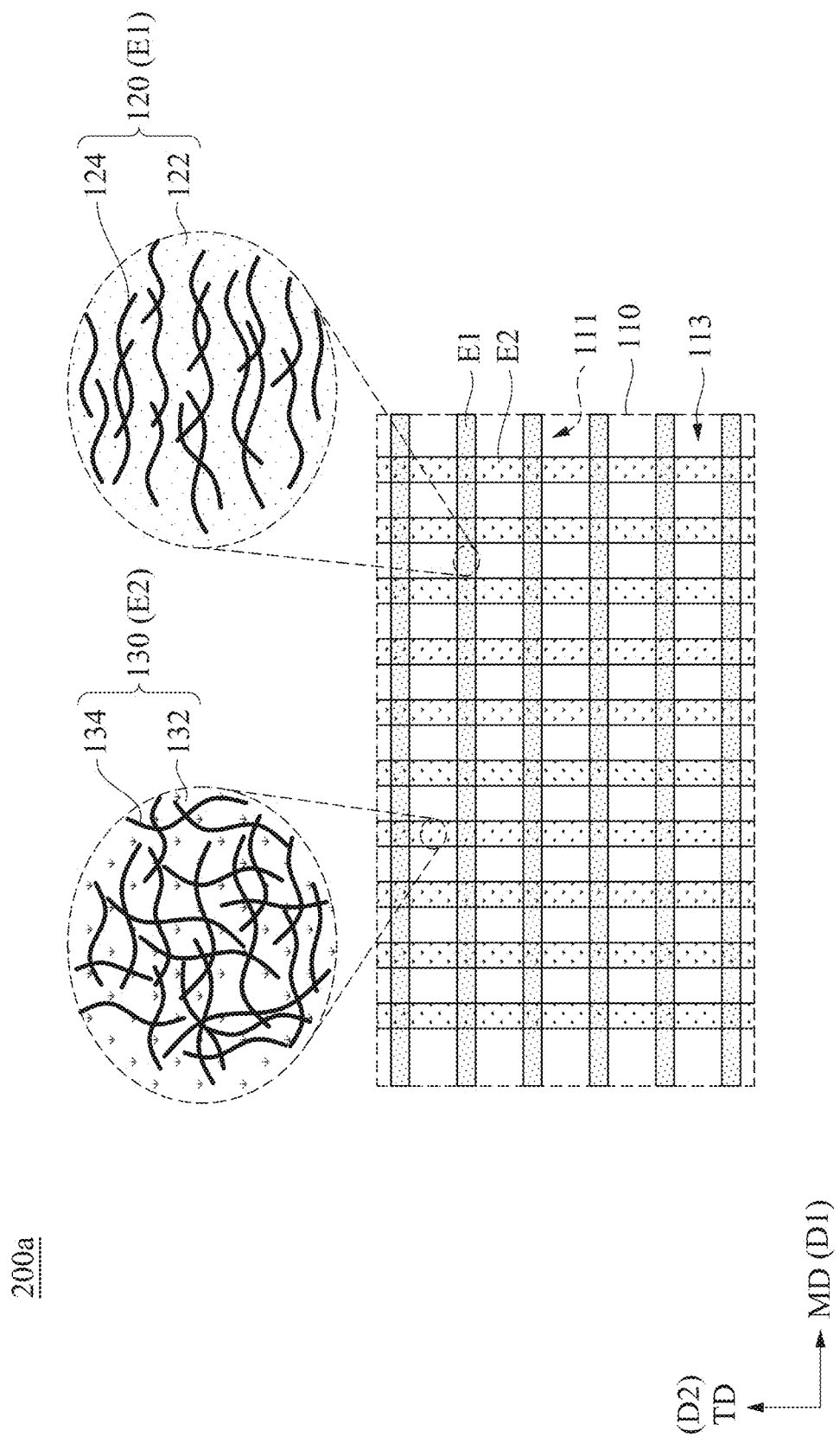
FIG. 7 is a partial perspective view illustrating a touch sensor according to some embodiments of the present disclosure.

Reference is made to FIG. 7, which is a partial perspective view illustrating a touch sensor 200a according to some embodiments of the present disclosure.

In detail, the touch sensor 200a is obtained by further patterning the first metal nanowire layer 120 and the second metal nanowire layer 130 in the conductive film 100a. The touch sensor 200a includes a substrate 110, a first metal nanowire layer 120, and a second metal nanowire layer 130. For the detail of the first metal nanowire layer 120 and the second metal nanowire layer 130, please refer to the foregoing, which will not be repeated hereinafter. The second metal nanowire layer 130 is disposed on the second surface 113 of the substrate 110 and is patterned to define a plurality of second electrodes E2 arranged at intervals and extending along the second direction D2, in which the first direction D1 is substantially perpendicular to the second direction D2.

For an application of a rectangular touch sensor 200a as shown in FIG. 7, the electrode corresponding to the longer side of the touch sensor 200a (also referred to as "long-side electrode"), such as the first electrode E1, often affects the function of touch sensing due to its larger line resistance. In this regard, since the first electrode E1 of the present disclosure is made of the first metal nanowire layer 120 with a high anisotropy value, the requirement of low line resistance for the long-side electrode can be met. In contrast, since the second electrode E2 is the short-side electrode of the touch sensor 200a, which has a length relatively short and will not affect the line resistance, the second electrode E2 can be patterned by the second metal nanowire layer 130 with a lower anisotropy value or even with an isotropy state. In this way, when the first metal nanowire layer 120 and the second metal nanowire layer 130 are made with the same ink in the same roll-to-roll process, the optical effects of the two layers (surfaces) can be consistent, and the line resistance requirements of the long-side electrodes and the short-side electrodes of the touch sensor 200a can be met.

Figure 8A:
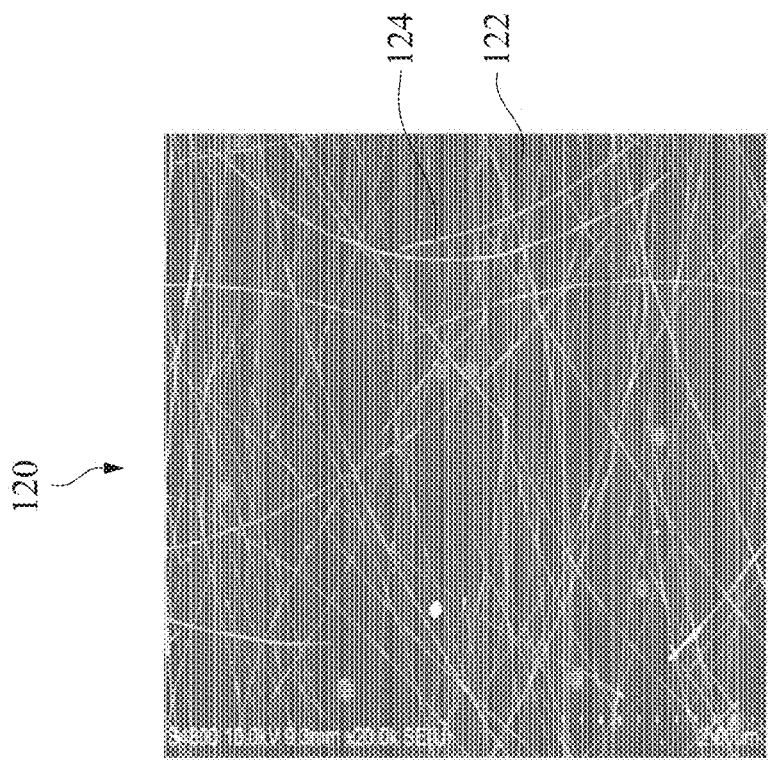
FIG. 8A and FIG. 8B are respective scanning electron microscope (SEM) images of metal nanowires in a first metal nanowire layer and metal nanowires in a second metal nanowire layer.
Figure 8B:
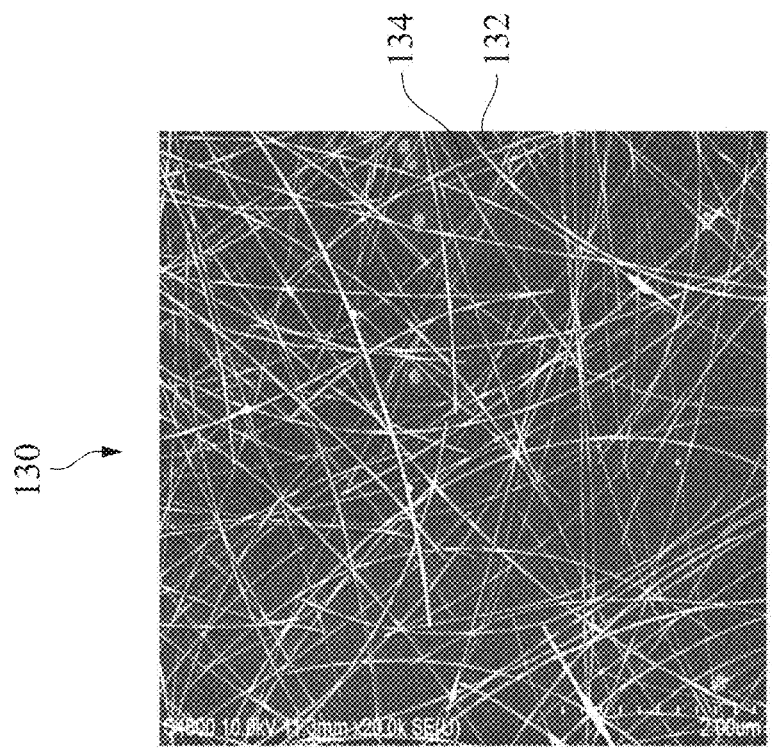

Reference is made to FIG. 8A and FIG. 8B, which are respective scanning electron microscope (SEM) images of metal nanowires in a first metal nanowire layer 120 and metal nanowires in a second metal nanowire layer 130. It can be seen from FIG. 8A that most of the metal nanowires 124 in the first metal nanowire layer 120 are arranged along the first dimension, and the overall arrangement of the metal nanowires 124 is relatively orderly and in the same direction.

Therefore, the first metal nanowire layer 120 has a higher anisotropy value. It can be seen from FIG. 8B that the metal nanowires 134 in the second metal nanowire layer 130 are randomly distributed, and therefore the second metal nanowire layer 130 has a lower anisotropy value, which is said to be more isotropic. Based on the aforementioned difference in the arrangement of the metal nanowires, when using the ink with the same concentration to make the first metal nanowire layer 120 and the second metal nanowire layer 130, the line resistance of the long-side electrodes (e.g., the first electrode E1) patterned by the first metal nanowire layer 120 can be effectively reduced to meet various application requirements.

It is worth noting that, for a touch sensor with a double-sided electrode design, since the metal nanowire layer with high anisotropy and the metal nanowire layer with low anisotropy (or even with isotropy) can be formed on two opposite surfaces (sides) of the substrate in advance, when using inks of the same specification (e.g., the same concentration) to make the double-sided metal nanowire layers, the metal nanowire layer with high anisotropy can be patterned to form the long-side electrodes with more demanding requirements for line resistance, while the metal nanowire layer with low anisotropy can be patterned to form the short-side electrodes with less demanding requirements for line resistance. In other words, there is no need to spend extra cost to use higher concentration ink, which is more expensive, to make the long-side electrodes with more demanding electrical requirements. In the present disclosure, when the second actual surface resistance of the second metal nanowire layer 130 is equal to the first actual surface resistance of the first metal nanowire layer 120 (i.e., the inks of the same specification are used to make the first metal nanowire layer 120 and the second metal nanowire layer 130), the first equivalent surface resistance of the first metal nanowire layer 120 is smaller than the second equivalent surface resistance of the second metal nanowire layer 130.

From another perspective, since the electrode formed by patterning the metal nanowire layer with high anisotropy can have a lower line resistance, ink with lower cost (lower concentration) can be selected to fabricate the metal nanowire layer while meeting the electrical requirements. In other words, when the first equivalent surface resistance of the first metal nanowire layer 120 is designed to be equal to the second equivalent surface resistance of the second metal nanowire layer 130, since the first metal nanowire layer 120 is formed by the ink of lower concentration, the first actual surface resistance of the first metal nanowire layer 120 is smaller than the second actual surface resistance of the second metal nanowire layer 130. Hence, the optical effect of the touch sensor can be effectively improved due to the relatively small haze of the first metal nanowire layer 120.

According to the aforementioned embodiments of the present disclosure, the present disclosure enables the first metal nanowire layer in the conductive film to have a high anisotropy value by intentionally providing airflow along the longitudinal direction during the fabrication of the conductive film. In this way, the touch sensor made of the conductive film can meet a more demanding electrical requirement under certain optical specifications, or the touch sensor made of the conductive film can meet a more demanding optical requirement under certain electrical specifications. Therefore, it is more flexible to balance the optical performance and the conductive performance of the touch sensor.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A conductive film, comprising:
   a substrate;
   a first metal nanowire layer disposed on a first surface of the substrate, wherein the first metal nanowire layer has a first anisotropy value larger than or equal to 2.8 and smaller than or equal to 4.0; and
   a second metal nanowire layer disposed on a second surface of the substrate, wherein the second surface faces away from the first surface, and the second metal nanowire layer is more isotropic than the first metal nanowire layer, wherein the second metal nanowire layer has a second anisotropy value smaller than 2.0.

2. The conductive film of claim 1, wherein the second anisotropy value of the second metal nanowire layer is larger than 1.0 and smaller than 1.5.

3. The conductive film of claim 1, wherein the second anisotropy value of the second metal nanowire layer is larger than 1.0 and smaller than 1.2.

4. A touch sensor, comprising:
   a substrate;
   a first metal nanowire layer disposed on a first surface of the substrate, wherein the first metal nanowire layer defines a plurality of first electrodes arranged at intervals and extending along a first direction, the first metal nanowire layer has a first actual surface resistance and a first equivalent surface resistance, and the first actual surface resistance is 1.4 times to 2.0 times the first equivalent surface resistance; and
   a second metal nanowire layer disposed on a second surface of the substrate, wherein the second metal nanowire layer defines a plurality of second electrodes arranged at intervals and extending along a second direction, the second surface faces away from the first surface, the second metal nanowire layer has a second actual surface resistance and a second equivalent surface resistance, and the second actual surface resistance is equal to the first actual surface resistance, wherein the first equivalent surface resistance is smaller than the second equivalent surface resistance.

5. The touch sensor of claim 4, wherein the first direction is perpendicular to the second direction.

6. The touch sensor of claim 4, wherein the second metal nanowire layer is more isotropic than the first metal nanowire layer.

7. The touch sensor of claim 6, wherein the second metal nanowire layer has a second anisotropy value smaller than 2.0.

8. The touch sensor of claim 4, wherein the first metal nanowire layer has a first anisotropy value larger than or equal to 2.8 and smaller than or equal to 4.0.

9. The touch sensor of claim 8, wherein the second metal nanowire layer has a second anisotropy value smaller than 2.0.

10. The touch sensor of claim 9, wherein the second metal nanowire layer is more isotropic than the first metal nanowire layer.

11. The touch sensor of claim 8, wherein the second metal nanowire layer is more isotropic than the first metal nanowire layer.

12. The touch sensor of claim 4, wherein the second metal nanowire layer has a second anisotropy value smaller than 2.0.

13. A touch sensor, comprising:
a substrate;
a first metal nanowire layer disposed on a first surface of the substrate, wherein the first metal nanowire layer defines a plurality of first electrodes arranged at intervals and extending along a first direction, the first metal nanowire layer has a first actual surface resistance and a first equivalent surface resistance, and the first actual surface resistance is 1.4 times to 2.0 times the first equivalent surface resistance; and
a second metal nanowire layer disposed on a second surface of the substrate, wherein the second metal nanowire layer defines a plurality of second electrodes arranged at intervals and extending along a second direction, the second surface faces away from the first surface, the second metal nanowire layer has a second actual surface resistance and a second equivalent surface resistance, the first actual surface resistance is smaller than the second actual surface resistance, and the first equivalent surface resistance is equal to the second equivalent surface resistance.

14. The touch sensor of claim 13, wherein the first direction is perpendicular to the second direction.

15. The touch sensor of claim 13, wherein the second metal nanowire layer is more isotropic than the first metal nanowire layer.

16. The touch sensor of claim 15, wherein the second metal nanowire layer has a second anisotropy value smaller than 2.0.

17. The touch sensor of claim 13, wherein the first metal nanowire layer has a first anisotropy value larger than or equal to 2.8 and smaller than or equal to 4.0.

18. The touch sensor of claim 17, wherein the second metal nanowire layer has a second anisotropy value smaller than 2.0.

19. The touch sensor of claim 18, wherein the second metal nanowire layer is more isotropic than the first metal nanowire layer.

20. The touch sensor of claim 13, wherein the second metal nanowire layer has a second anisotropy value smaller than 2.0.

\* \* \* \* \*